Figure 1:
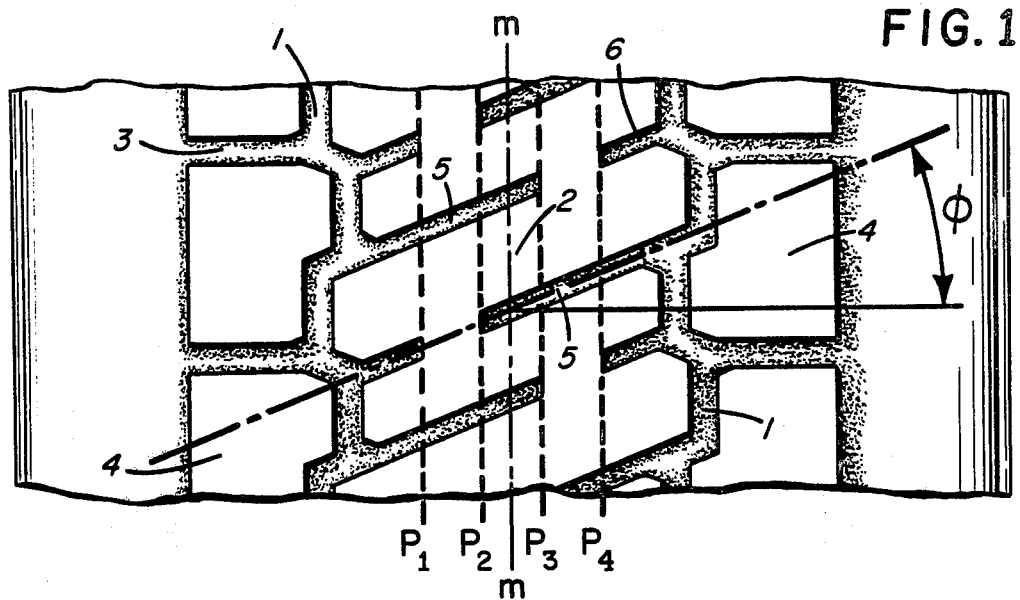

United States Patent [19]

Caretta

[11] 4,416,317

[45] * Nov. 22, 1983

[54] PNEUMATIC TIRE FOR MOTOR VEHICLES HAVING A TREAD PATTERN WHICH ADAPTS THE TIRE FOR GOOD PERFORMANCE AND LOW ROAD NOISE

[75] Inventor: Renato Caretta, Gallarate, Italy

[73] Assignee: Societa' Pneumatici Pirelli S.p.A., Milan, Italy

[*] Notice: The portion of the term of this patent subsequent to Aug. 30, 1997 has been disclaimed.

[21] Appl. No.: 326,401

[22] Filed: Dec. 1, 1981

[30] Foreign Application Priority Data

Dec. 5, 1980 [IT] Italy .............................. 26490 A/80

[51] Int. Cl.³ ...................... B60C 11/08; B60C 11/12
[52] U.S. Cl. .............................. 152/209 R; D12/143
[58] Field of Search .......... 152/209 R, 209 A, 209 B, 152/209 WT, 209 D; D12/140, 142, 143, 144-149

[56] References Cited

U.S. PATENT DOCUMENTS

| | | | |
|---|---|---|---|
| D. 210,187 | 2/1968 | Newman | D12/149 |
| D. 213,245 | 1/1969 | Newman | D12/149 |
| D. 231,979 | 7/1974 | Stevens | D12/142 |
| D. 239,931 | 5/1976 | Duncan | D12/146 |
| D. 242,784 | 12/1976 | Newman | D12/148 |
| D. 248,227 | 6/1978 | Jamain | D12/148 |
| D. 264,455 | 5/1982 | Hart | D12/15 |
| D. 264,956 | 6/1982 | Hart | D12/146 |
| D. 265,896 | 8/1982 | Hutz | D12/143 |

*Primary Examiner*—Edward C. Kimlin
*Assistant Examiner*—F. K. Wine
*Attorney, Agent, or Firm*—Stevens, Davis, Miller & Mosher

[57] ABSTRACT

A pneumatic tire for a motor vehicle has a tread band having at least two longitudinal grooves which divide it into a plurality of circumferential ridges, and a series of circumferentially spaced axial grooves which divide the two outermost ridges into blocks. The edges of the inner ridges are provided with blind, oblique slits, all inclined in the same sense with respect to the circumferential direction of the tire. The slits are substantially parallel to one another and are preferably offset with respect to each other.

6 Claims, 3 Drawing Figures

PNEUMATIC TIRE FOR MOTOR VEHICLES HAVING A TREAD PATTERN WHICH ADAPTS THE TIRE FOR GOOD PERFORMANCE AND LOW ROAD NOISE

This invention relates generally to pneumatic tires for motorvehicles and in particular to the raised pattern, usually known and hereinafter indicated as "tread pattern", provided on the outer surface of the tire to contact the road surface.

It is known that in pneumatic tires the radially outer surface, axially extending from one tire sidewall to the other, is provided with a plurality of grooves in the thickness of the tread band and arranged in various ways in order to divide the band into ridges and/or blocks, mutually spaced from one another by the grooves. The ridges and blocks are provided with "lamels", namely thin slits directed from the outer surface towards the inside of the tire. The slits are of variable depth and sometimes reach the sides of the ridges and blocks.

The plot formed by the grooves and the slits constitutes the tread pattern, which is a typical and characterizing element of the tire, variable in accordance with the use to which the tire is to be subjected.

By way of example, the specialized tires of the "winter" type have a pattern provided with a large number of blocks and deep grooves in order to increase road holding on snowy or muddy ground peculiar to the winter season, while the tread pattern of the tires to be used on well maintained roads in normal weather under normal service conditions are usually characterized by large circumferential ridges sometimes having a zig-zag path, from which transverse grooves depart. The grooves of the latter pattern are generally much thinner than the former, more or less inclined and long, which in some cases intersect completely the longitudinal ridges. Sometimes these ridges are provided with a further series of slits.

In fact, the main purpose of such patterns is that of breaking the liquid layer which exists between the tire and a wet road surface (for instance when it rains), insuring therefore good maneuvrability, satisfactory driving stability and good grip on a wet road surface.

Tread patterns of such latter type must possess in a high degree some behavior characteristics which until now has been considered of minor importance in the specialized patterns, in favor of an improvement of the features more necessary in the specific use.

In other words, the patterns indicated as "normal", to which the pattern forming the object of the invention belongs, must possess in the highest degree uniform wear, silent running and comfort characteristics, which are considered of minor importance in special patterns, like those used for winter, rally, off-the-road tires and so on.

Unfortunately, these features oppose each other: for instance, uniform wear is the result of a tread pattern in which the ratio between solid and hollow areas, called "filling coefficient" is high, namely, a compact tread, having few movable blocks below the impression area and therefore a few thin grooves; all of this has a relevant negative effect on the tire behavior in respect of the aquaplaning phenomenon.

In fact, to avoid aquaplaning, the pattern must have widely spaced blocks provided with several slits, that is many large grooves and therefore a low filling coefficient.

These features, which increase in a large degree the mobility of the blocks below the impression area, effect in a negative sense the achievement of a uniform and slowly wearing tire.

Further, patterns of this kind are in general rather noisy, even on smooth roads in good conditions, because, due to their peculiar characteristics, they generate a series of acoustic phenomena, that is, main waves and their harmonics, of a particular frequency which often resonate with each other, and are very difficult to eliminate.

An object of the present invention is to provide a tread pattern for pneumatic tires for motorvehicles, in particular automobiles, which constitutes a very good compromise between the various different behavior characteristics of the tire, i.e., it wears uniformly, rides comfortably, is substantially noiseless, and has very good road traction on wet ground and on drift, and good driving stability and maneuverability characteristics.

Figure 2:
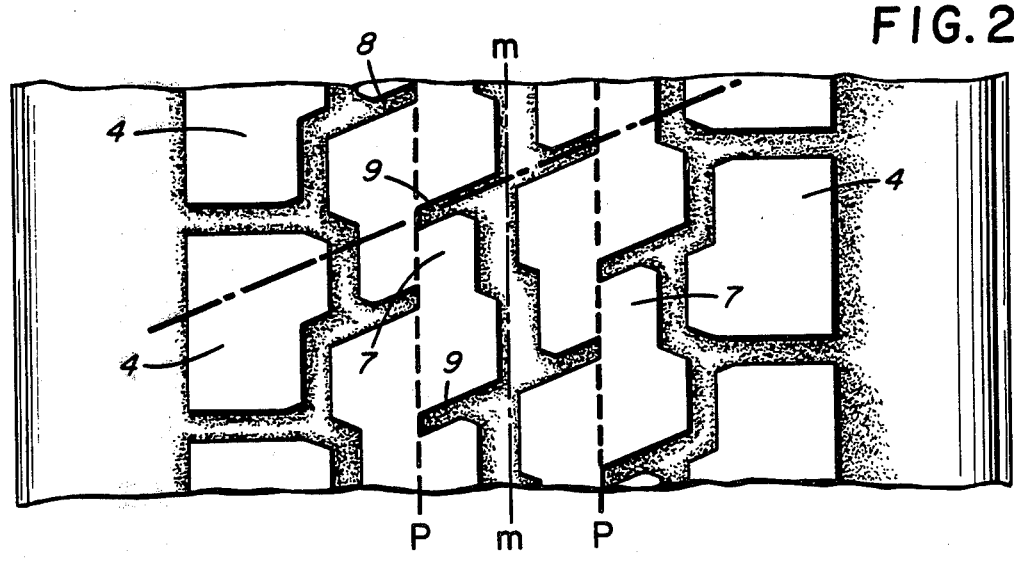
Figure 3:
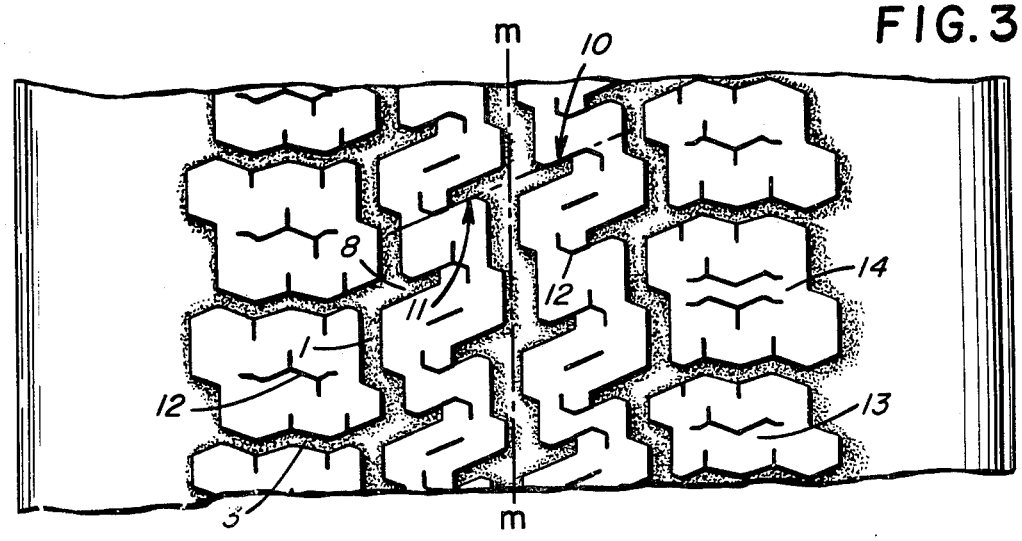

Other objects will become apparent from the following description with reference to the accompanying drawing wherein FIG. 1 illustrates diagrammatically in a fragmentary plan view a first embodiment of a tread pattern according to the invention, showing a central ridge and two rows of lateral blocks;

FIG. 2 illustrates diagrammatically in fragmentary plan a second embodiment of a tread pattern according to the invention, showing two central ridges and two rows of lateral blocks; and FIG. 3 illustrates diagrammatically in plan a third embodiment of a tread pattern according to the invention, showing an arrangement similar to that of FIG. 2.

The foregoing objects and others are accomplished in accordance with this invention, generally speaking, by providing a pneumatic tire for motorvehicles which has on its radially outer surface a tread band provided with a plurality of substantially radial recesses and slits which define the tread pattern of the tire, the pattern comprising at least two continuous longitudinal grooves, symmetrical with respect to the tire midline, which divide the tread band into circumferential portions having substantially the same width, each inner circumferential portion or portions being represented by a circumferentially continuous ridge, the two axially outer circumferential portions being divided into a plurality of circumferentially spaced apart blocks, the circumferential spacing between the blocks being accomplished by a plurality of transverse grooves extending in a substantially axial direction, the tire being characterized in that the pattern, on the sides of the ridges, comprises grooves, oblique with respect to the axial direction, the oblique grooves being all inclined in the same sense.

According to a typical embodiment of the pattern, the oblique grooves are inclined, with respect to the circumferential direction of the tire, at an angle which is preferably between 75° and 55°; moreover, each oblique groove has its own axis distinct from that of the other grooves and further, preferably, all the grooves of the same series, defined by their position and characteristics in the ridge, have their axially inner ends lying on a single plane, perpendicular to the tire axis.

Usually, the number of planes is two, owing to the presence of only two series of grooves, one at each side of the ridge edges; however, according to different alternative embodiments, planes may coincide into a single plane, which, in its turn, may coincide with the middle plane of the ridge. It is evident that, in the latter case, the oblique grooves extending from the ridge edge do not exceed the middle plane.

According to a further alternative embodiment, the planes can be more than two when grooves of different length are provided on the ridge edge.

In any event, the axial distance between pairs of adjacent planes does not exceed 30% of the maximum ridge width.

According to a further particular embodiment, the tire tread pattern provided by the invention has three circumferential grooves, the central groove being located at the tire midline, so as to originate two axially inner circumferential ridges, in which the axially inner oblique grooves can be aligned along the same axis, giving therefore rise to a single oblique groove astride of the tire midline.

Finally, which ever pattern is carried out according to the present invention, it is advisable for the projections of the oblique grooves along the circumferential direction of the tire to form a continuous line without any superimposition of segments, that is the axial inner ends of the oblique grooves of a particular ridge are parallel lines which do not overlap and for the axially outermost oblique grooves to be substantially facing said transverse grooves.

One embodiment of a tread pattern provided by the invention is illustrated in FIG. 1. The illustrated tire pattern has two circumferential grooves 1, symmetrical with respect to the tire mid-circumferential plane m-m which follow a slightly sinusoidal path. The grooves 1 divide the tread band into three circumferential portions of substantially equivalent width.

The central portion 2, even if it is provided with further slits, maintains a circumferential continuity and therefore is considered a ridge, while the two lateral portions are subdivided by a plurality of transverse grooves 3, substantially directed in an axial sense, so as to form a series of circumferentially arranged blocks 4.

The ridge 2 is instead provided with a plurality of slits 5 and 6 which, departing from the ridge edges, extend axially towards the ridge's inside along an oblique direction, namely one inclined both to the axial direction and to the tire circumferential direction.

According to the invention, the slits are all inclined in the same way (i.e., in the same sense) with respect to the axial direction; inclined at angles of 15° to 35°, that is 55° to 75° with respect to the midline of the tire.

In FIG. 1, the ridge 2 carries two series of slits for each edge, namely a first series of rather long slits 5 and a second series of rather short slits 6.

Although each slit may have a length of its own, different from that of the others, in this embodiment it was considered convenient to adopt having only two slit lengths; therefore, mention can be made of two series of slits, each series being characterized by the length of the slits.

In this way, the axially inner ends of each series of slits lie on the same plane (p1, p2, p3, p4) perpendicular to the tire axis.

It was found that, conveniently, the axial distance between two pairs of adjacent planes is preferably not greater than 30% of the maximum width of the ridge.

FIG. 2 illustrates a second embodiment of the tread pattern according to the invention, which comprises first of all three longitudinal or circumferential grooves, namely a central groove arranged at the tire midline m-m, and two lateral grooves symmetrical therewith.

This provides two central circumferential ridges 7 and two lateral circumferential rows of blocks 4.

Each ridge is provided, on both edges, with a series of axially outer slits 8 and of axially inner slits 9.

In this embodiment, the slit ends axially inner to each ridge all lie on a single plane p; in other words, with reference to FIG. 1, the planes p1, p2, p3 and p4 coincide into a single plane p, which preferably coincides with the middle plane of the ridge.

According to a further advantageous embodiment, the two axially inner slits 9 of each ridge are aligned along the same axis, constituting consequently a single groove, parallel to but distinct from, the axially outer slits 8.

A further advantageous feature is represented by the fact that the projection of all of said grooves along the tire circumferential direction (for the sake of clearness indicated laterally in FIG. 2) form a continuous line; preferably not containing superimposed segments.

FIG. 3 illustrates a further alternative embodiment, drawn on the basis of the arrangement of FIG. 2, but this embodiment does not contain the reference numerals which concern elements already shown in FIGS. 1 and 2, since the identification of those elements in this pattern should be quite easy; however differently from what is shown in FIG. 2 in the present embodiment the axially inner grooves of the ridges have their circumferentially adjacent edges 10 and 11 aligned along the same axis.

The latter tread, illustrated in detail also with reference to its slits 12, shows two advantageous features which enhance the satisfactory results obtained with the pattern according to the invention. More precisely, the transverse grooves 3, which separate the blocks from one another, are facing the axially outer oblique slits 8 of the two central ridges, facilitating therefore a quick and strong discharge of water present on the road surface which is collected by grooves 1 of the pattern. In addition, variation of the circumferential size of the blocks, as that between blocks 13 and 14, has the advantageous result of breaking the sequence of acoustic waves, having a harmonic frequency, which are instead generated in periodically repeated equal elements of the pattern, with a convenient reduction of noise, in particular of the well known tire squeal.

It is believed that the favorable results obtained with the tire in accordance with the invention, in particular as regards its modest tread wear, uniform rolling and low road noise, can be attributed in particular to the inclination of the slits in the ridge edges.

In fact, from the conventional patterns generally used it is known that when an oblique recess extends below the impression area, the edge of the corresponding block strikes against the road level and the block deforms, moving under the impression area.

First of all, the vibration of the strike of the tread moves through the tire, is directly transmitted to the car body, and also gives rise to non-uniform rolling, and, secondly, it causes a pressure wave on the air volume contained in the groove, which wave aids in increasing the tire noise, in particular the acoustic phenomenon known as tire squeal. Moreover, movement of the block under the impression area is chiefly responsible for tread wear.

For this reason, theoretically the most silent tire having the least wear would be, in conclusion, a completely smooth tire, because it does not have differentiated impact fronts, i.e. discontinuities consequent to the alternate sequence of solid and hollow areas in the tire's rolling surface.

Obviously, the above described tire could not be used for normal road service, owing to its absolute lack of traction on wet ground.

The inventive principle in the embodiment of this pattern was that of recreating this continuity between the various impact fronts of the oblique recesses which enter and come out of the impression area during the tire rolling, maintaining at the same time the subdivision of the tread band, which ensures a good behavior of the tire in respect of aquaplaning.

To better understand this principle, reference can be made to a comparison between a helical toothed gear and a straight-tooth gear; in the latter case each tooth, meshing with its corresponding tooth, originates a strike and the rolling movement takes place by jerks, with a consequent noise and irregular motion.

In the helical tooth gear, each tooth meshes with its corresponding tooth before the separation of the pair of the cooresponding teeth which precedes it in the motion; the result is a silent motion and uniform rolling.

In the Applicant's opinion, this result is achieved also in the tire according to the invention which, in comparison with the conventional tires shows lesser, regular and uniform wear and uniform rolling; in this connection, mention is still made of the fact that the projection of the oblique slits in the circumferential direction is represented by a continuous line, namely one devoid of discontinuous zones.

Further, the Applicant ascertained that the pattern according to the invention, in particular in the embodiment of FIG. 3, in which the solid to hollow spaces ratio, i.e. the filling coefficient is 0.69, shows a noise level equal to that of the patterns in which the filling coefficient is at least equal to 0.73, namely of very compact patterns.

It is understood that the present description is given only by way of non-limiting example, so that the application comprises in its scope all those modifications and variations, even if not specifically described here, which are easily deducible from the present inventive idea by a technician skilled in this field.

What is claimed is:

1. In a pneumatic tire for motor vehicles which has on its radially outer surface a tread band provided with a tread pattern comprising at least three longitudinal grooves, with a central groove along the tire midline and two longitudinal grooves symmetrical with respect to the tire midline, which divide the tread band into circumferential portions having substantially the same width; the two axially outer circumferential portions being further divided into a plurality of circumferentially spaced apart blocks by a plurality of transverse grooves extending in a substantially axial direction, the inner circumferential portions being at least two continuous circumferential ridges, the edges of said ridges being grooved with oblique grooves all inclined in the same sense with respect to the midline of the tire and substantially parallel to one another, the improvement comprising each said oblique groove having a rectilinear axis inclined with respect to said midline of the tire at an angle of between 55° and 75°, the projections of the axis of the oblique grooves on one edge of each ridge being distinct from the axis of the oblique grooves on the other edge of that ridge; the oblique grooves on the axial inner edges of said two ridges being generally in alignment with each other so as to form a single oblique groove extending on both sides of said central groove, the projections of all said oblique grooves along the circumferential direction of the tire constituting parallel lines which do not overlap.

2. The tire of claim 1 in which the axial inner ends of the oblique grooves of one edge of a ridge lie on a circumferential plane in that ridge.

3. The tire of claim 1 in which the axial inner ends of all of the oblique grooves, extending from both edges of each ridge, lie on a common circumferential plane in that ridge.

4. The pneumatic tire of claim 1 wherein the oblique grooves along the axial outer edges of said two ridges substantially face said transverse grooves.

5. In a pneumatic tire for motor vehicles which has on its radially outer surface a tread band provided with a tread pattern comprising at least two longitudinal grooves, symmetrical with respect to the tire midline, which divide the tread band into circumferential portions having substantially the same width; the two axially outer circumferential portions being further divided into a plurality of circumferentially spaced apart blocks by a plurality of transverse grooves extending in a substantially axial direction, the inner circumferential portion being at least one continuous circumferential ridge, both edges of said at least one ridge being grooved with oblique grooves all inclined in the same sense with respect to the midline of the tire and substantially parallel to one another, the improvement comprising said oblique grooves each have a rectilinear axis, inclined with respect to said midline of the tire at an angle of between 55° and 75°, the projections of each said oblique groove in the axial inward direction of the tire being in alignment with an oblique groove on the other edge of said ridge; the axial inner ends of alternate oblique grooves terminating along the same circumferential plane so that the axial inner ends of adjacent oblique grooves are offset with respect to each other.

6. The tire of claim 5 in which the axial inner ends of the oblique grooves of one edge of a ridge lies on a first circumferential plane and the axial inner ends of the oblique grooves of the other edge of that ridge lie on a second circumferential plane and the axial distance between said first and second planes does not exceed 30% of the maximum width of said ridge.

* * * * *